United States Patent
Kozuka (10) Patent No.: US 11,139,492 B2
(45) Date of Patent: Oct. 5, 2021

(54) FUEL CELL SYSTEM

(71) Applicant: TOYOTA JIDOSHA KABUSHIKI KAISHA, Toyota (JP)

(72) Inventor: Tomoyuki Kozuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 80 days.

(21) Appl. No.: 16/665,064

(22) Filed: Oct. 28, 2019

(65) Prior Publication Data

US 2020/0168926 A1 May 28, 2020

(30) Foreign Application Priority Data

Nov. 27, 2018 (JP) .............................. JP2018-221030

(51) Int. Cl.
| | |
|---|---|
| *H01M 8/04* | (2016.01) |
| *H01M 8/0438* | (2016.01) |
| *H01M 8/04082* | (2016.01) |
| *H01M 8/0432* | (2016.01) |
| *H01M 8/04029* | (2016.01) |
| *H01M 8/04537* | (2016.01) |
| *H01M 8/04089* | (2016.01) |

(52) U.S. Cl.
CPC ... *H01M 8/04417* (2013.01); *H01M 8/04029* (2013.01); *H01M 8/04097* (2013.01); *H01M 8/04201* (2013.01); *H01M 8/04343* (2013.01); *H01M 8/04626* (2013.01)

(58) Field of Classification Search
CPC ......... H01M 8/04417; H01M 8/04029; H01M 8/04097; H01M 8/04201; H01M 8/04343; H01M 8/04626
See application file for complete search history.

(56) References Cited

U.S. PATENT DOCUMENTS

| | | | | |
|---|---|---|---|---|
| 2006/0065520 A1* | 3/2006 | Ballantine | ........... | H01M 8/0263 204/279 |
| 2016/0039279 A1* | 2/2016 | Bills | ...................... | B60K 15/03 165/56 |

(Continued)

FOREIGN PATENT DOCUMENTS

| | | | |
|---|---|---|---|
| JP | 2010205654 A | * | 9/2010 |
| JP | 2014-044797 A | | 3/2014 |

(Continued)

OTHER PUBLICATIONS

Machine translation of JP-2018098068-A (no date).*

(Continued)

*Primary Examiner* — Amanda C. Walke
(74) *Attorney, Agent, or Firm* — Dickinson Wright, PLLC (57) ABSTRACT

A fuel cell system comprises a fuel cell, a fuel gas supply pipe connected to a fuel gas inlet of the fuel cell, a circulation pipe connecting a fuel off gas outlet of the fuel cell and the fuel gas supply pipe, a hydrogen pump disposed on the circulation pipe, a water pump configured to deliver coolant discharged from the fuel cell to the hydrogen pump, an acquisition unit configured to obtain at least one parameter corresponding to temperature of fuel gas exhausted from the hydrogen pump, and a controller configured to switch between ON and OFF states of the water pump according to the parameter obtained by the acquisition unit.

5 Claims, 9 Drawing Sheets

(56) References Cited

U.S. PATENT DOCUMENTS

| | | | | |
|---|---|---|---|---|
| 2017/0233878 A1* | 8/2017 | Yakumaru | ........... | H01M 8/1018 |
| | | | | 204/265 |
| 2018/0205100 A1* | 7/2018 | Hosoi | ............... | H01M 8/04164 |
| 2018/0261859 A1* | 9/2018 | Oya | ................. | H01M 8/04388 |
| 2019/0009209 A1* | 1/2019 | Ukai | .................... | B01D 53/326 |
| 2019/0148751 A1* | 5/2019 | Kozuka | ............ | H01M 8/04029 |
| | | | | 429/434 |
| 2019/0270379 A1* | 9/2019 | Pydin | ....................... | B60K 1/00 |
| 2020/0251754 A1* | 8/2020 | Rama | ............... | H01M 8/04417 |

FOREIGN PATENT DOCUMENTS

| | | | |
|---|---|---|---|
| JP | 2017-130253 A | | 7/2017 |
| JP | 2018098068 A | * | 6/2018 |

OTHER PUBLICATIONS

Machine translation of JP-2010205654-A (no date).*
U.S. Appl. No. 16/168,051, for "Fuel Cell System," filed Oct. 23, 2018.

* cited by examiner

FUEL CELL SYSTEM

CROSS REFERENCE TO RELATED APPLICATIONS

The present application claims priority to Japanese Patent Application No. 2018-221030, filed on Nov. 27, 2018, the contents of which are incorporated herein by reference in their entirety.

BACKGROUND

Field

The present disclosure relates to a fuel cell system.

Related Art

A known fuel cell system includes a circulation pipe, through which fuel off gas is circulated into a fuel gas supply pipe, and a hydrogen pump disposed on the circulation pipe to circulate the fuel off gas, in order to effectively use hydrogen gas serving as fuel. For example, JP2014-44797A describes a fuel cell system including a hydrogen pump disposed on an outer surface of an end plate on one end side of a fuel cell stack so as to circulate fuel off gas.

An Inventor of the present disclosure have found that temperature of the fuel off gas exhausted from the hydrogen pump rises when the hydrogen pump is disposed apart from the fuel cell. A rise in the temperature of the fuel off gas exhausted from the hydrogen pump may cause various problems. For example, a gasket is usually disposed in an outlet of the hydrogen pump; however, heat resisting temperature of the gasket needs to be raised if the temperature of the fuel off gas rises.

SUMMARY

According to one aspect of the present disclosure, a fuel cell system is provided. The fuel cell system comprises a fuel cell, a fuel gas supply pipe connected to a fuel gas inlet of the fuel cell, a circulation pipe connecting a fuel off gas outlet of the fuel cell and the fuel gas supply pipe, a hydrogen pump disposed on the circulation pipe, a water pump configured to deliver coolant, discharged from the fuel cell, to the hydrogen pump, an acquisition unit configured to obtain at least one parameter corresponding to temperature of fuel gas exhausted from the hydrogen pump, and a controller configured to switch between ON and OFF states of the water pump according to the parameter obtained by the acquisition unit.

DETAILED DESCRIPTION

A. First Embodiment

A1. Configuration of Fuel Cell System

Figure 1:
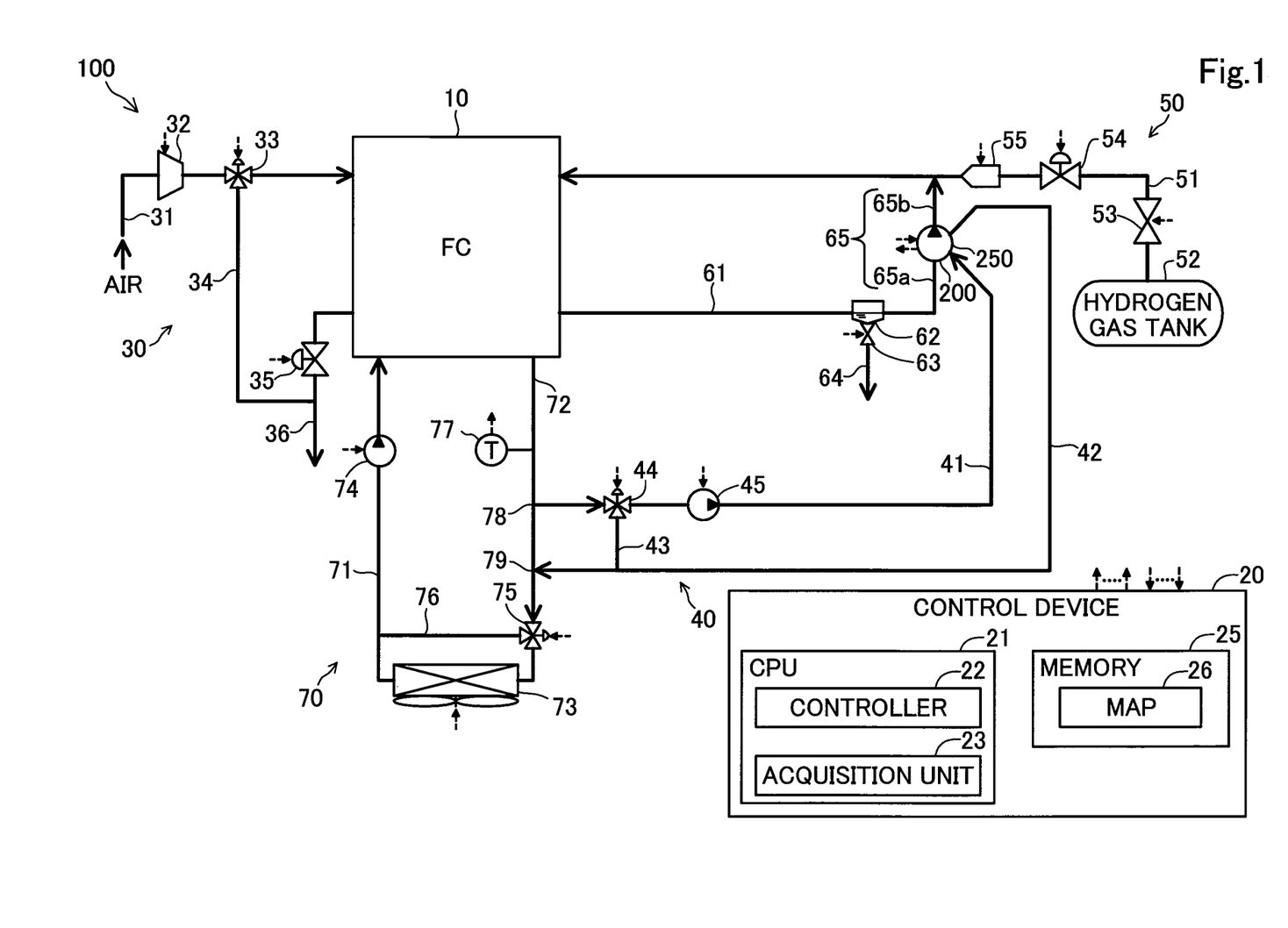
FIG. 1 shows a configuration of a fuel cell system.

FIG. 1 shows a configuration of a fuel cell system 100 according to one embodiment of the present disclosure. The fuel cell system 100 is, for example, mounted on a vehicle and configured to output electricity as a power source for the vehicle according to a request from a driver. The fuel cell system 100 comprises a fuel cell 10, an oxidizing gas supply-discharge unit 30, a fuel gas supply-discharge unit 50, a coolant circulation unit 70, a hydrogen pump cooling unit 40, and a control device 20.

The fuel cell 10 is a polymer electrolyte fuel cell that generates electricity upon receiving hydrogen gas and air supplied as reaction gas. The fuel cell 10 has a stack structure with a plurality of cells stacked. Each of the plurality of cells includes a membrane electrode assembly having an electrolyte membrane and electrodes disposed on both surfaces of the electrolyte membrane, a pair of gas diffusion layers and a pair of separators sandwiching the membrane electrode assembly. Illustration of this configuration is omitted.

The oxidizing gas supply-discharge unit 30 is configured to take in air from outside air as oxidizing gas, supply it to the fuel cell 10, and discharge oxidizing off gas from the fuel cell 10 to the outside. The oxidizing gas supply-discharge unit 30 includes an oxidizing gas pipe 31, an air compressor 32, a flow dividing valve 33, a cathode bypass pipe 34, a cathode pressure regulating valve 35, and an oxidizing off gas pipe 36.

The oxidizing gas pipe 31 is connected to an oxidizing gas supply manifold formed in the fuel cell 10 in a communicating manner. The air compressor 32 is disposed on the oxidizing gas pipe 31 and configured to compress the air taken in from the outside air and supply the compressed air to the fuel cell 10 according to a control signal from the control device 20. The flow dividing valve 33 is disposed at a connecting portion between the oxidizing gas pipe 31 and the cathode bypass pipe 34. The flow dividing valve 33 is configured to adjust flow rates of the air, supplied from the air compressor 32, supplied to the fuel cell 10 and the cathode bypass pipe 34. The cathode bypass pipe 34 is configured to introduce at least part of the compressed air, supplied from the air compressor 32 depending on an opening degree of the flow dividing valve 33, to the oxidizing off gas pipe 36.

The oxidizing off gas pipe 36 is connected to an oxidizing off gas discharge manifold formed in the fuel cell 10 in a communicating manner. The oxidizing off gas pipe 36 is configured to discharge the oxidizing off gas, exhausted from each of the plurality of cells, to the outside of the fuel cell system 100. The oxidizing off gas includes produced water produced as a result of power generation by the fuel cell 10, as well as the air. The cathode pressure regulating valve 35 is configured to adjust pressure of the oxidizing off gas in the oxidizing off gas pipe 36 according to a control signal from the control device 20.

The fuel gas supply-discharge unit 50 is configured to supply the hydrogen gas serving as the fuel gas to the fuel cell 10 and discharge the fuel off gas to the outside of the fuel cell 10. The fuel gas supply-discharge unit 50 includes fuel gas supply pipe 51, a hydrogen gas tank 52, an on-off valve 53, an anode pressure regulating valve 54, an injector 55, a fuel off gas pipe 61, a gas-liquid separator 62, a gas-liquid discharge valve 63, a gas-liquid discharge pipe 64, a circulation pipe 65, and a hydrogen pump 200.

The fuel gas supply pipe 51 connects the hydrogen gas tank 52 and the fuel gas supply manifold formed in the fuel cell 10 and is configured to supply the hydrogen gas in the hydrogen gas tank 52 and the hydrogen gas supplied from the hydrogen pump 200 to the fuel cell 10. The on-off valve 53, the anode pressure regulating valve 54, and the injector 55 are disposed in the fuel gas supply pipe 51 in this order from the hydrogen gas tank 52 to the fuel cell 10.

The on-off valve 53 is configured to open and close according to a control signal from the control device 20 so as to control an inflow of the hydrogen gas from the hydrogen gas tank 52 to the injector 55. The on-off valve 53 is closed when the fuel cell system 100 is stopped. The anode pressure regulating valve 54 is configured to adjust pressure of the hydrogen gas to be supplied to the injector 55 to predetermined pressure according to a control signal from the control device 20. The injector 55 is configured to open and close a valve in accordance with a driving cycle and opening/closing time set by the control device 20 according to a control signal from the control device 20 so as to supply the hydrogen gas to the fuel cell 10 and also adjust a supply amount of the hydrogen gas.

The fuel off gas pipe 61 connects fuel off gas discharge manifold formed in the fuel cell 10 and the gas-liquid separator 62. The fuel off gas pipe 61 is a flow path configured to discharge the fuel off gas from the fuel cell 10. The fuel off gas includes the hydrogen gas and nitrogen gas, unused in power generating reaction, and further includes the produced water produced by the power generation of the fuel cell 10. The fuel off gas pipe 61 is configured to introduce the fuel off gas to the gas-liquid separator 62.

The gas-liquid separator 62 is connected between the fuel off gas pipe 61 and the circulation pipe 65. The gas-liquid separator 62 is configured to separate the hydrogen gas and the water included in the fuel off gas in the fuel off gas pipe 61 from each other, introduce gas including the hydrogen gas into the circulation pipe 65, and accumulate the water.

The gas-liquid discharge valve 63 is an on-off valve disposed in a lower part of the gas-liquid separator 62. The gas-liquid discharge valve 63 is configured to open and close according to a control signal from the control device 20 so as to discharge the water separated by the gas-liquid separator 62 and impurity gas such as the nitrogen gas included in the fuel off gas to the gas-liquid discharge pipe 64. The circulation pipe 65 is connected to the fuel gas supply pipe 51 on a downstream side of the injector 55. A hydrogen pump 200 is disposed on the circulation pipe 65, the hydrogen pump 200 being driven according to a control signal from the control device 20.

The hydrogen pump 200 is configured to operate according to a control signal from the control device 20 so as to deliver the gas, including the hydrogen gas, separated by the gas-liquid separator 62 to the fuel gas supply pipe 51. In the fuel cell system 100, the gas including the hydrogen gas included in the fuel off gas is circulated to be supplied to the fuel cell 10 again. Thus, utilization efficiency of the hydrogen gas is improved. The hydrogen pump 200 includes a cylinder flow path 250. In the cylinder flow path 250 flows coolant supplied from the hydrogen pump cooling unit 40 described later. A configuration of the hydrogen pump 200 will be described later.

In the present embodiment, a rotation quantity and a flow rate, which are driving force of the hydrogen pump 200, can be calculated from electricity supplied to the hydrogen pump 200 by the control device 20. Such driving force is calculated by detecting voltage and current supplied to the hydrogen pump 200 by the control device 20 or voltage and current input to the control device 20, by a voltage-current sensor, not shown.

The coolant circulation unit 70 is configured to circulate the coolant via the fuel cell 10 so as to adjust temperature of the fuel cell 10. In the present embodiment, non-freezing water such as ethylene glycol is used as the coolant. Note that the coolant is not limited to the non-freezing water, but may be water, air, or the like. The coolant circulation unit 70 includes a coolant supply pipe 71, a coolant discharge pipe 72, a radiator 73, a circulation pump 74, a three-way valve 75, a coolant bypass pipe 76, and a temperature acquisition unit 77.

The coolant supply pipe 71 is connected to a coolant supply manifold formed in the fuel cell 10. The coolant discharge pipe 72 is connected to a coolant discharge manifold formed in the fuel cell 10. The radiator 73 is connected to the coolant discharge pipe 72 and the coolant supply pipe 71 and configured to cool the coolant flowing in from the coolant discharge pipe 72 by wind sent from an electric fan, not shown, or the like, and then discharge it to the coolant supply pipe 71.

The circulation pump 74 is disposed on the coolant supply pipe 71 and configured to pump the coolant into the fuel cell 10 by driving force of the circulation pump 74. The three-way valve 75 is configured to adjust flow rates of the coolant supplied to the radiator 73 and the coolant bypass pipe 76. The temperature acquisition unit 77 is disposed on an upstream side of a connecting portion 78 between the coolant discharge pipe 72 and the coolant supply pipe 41 of the hydrogen pump cooling unit 40. The temperature acquisition unit 77 is configured to measure temperature of the coolant in the coolant discharge pipe 72 and transmit a measured result to the control device 20.

The hydrogen pump cooling unit 40 is configured to let the coolant flow in the cylinder flow path 250 of the hydrogen pump 200 so as to cool a cylinder, that is, a housing, of the hydrogen pump 200. The hydrogen pump cooling unit 40 includes a coolant supply pipe 41, a coolant return pipe 42, a three-way valve 44, a coolant bypass pipe 43, and a water pump 45.

The coolant supply pipe 41 connects the connecting portion 78 (hereinafter also referred to as a "branching position") with the coolant discharge pipe 72 of the coolant circulation unit 70 and an inlet of the cylinder flow path 250 of the hydrogen pump 200. The coolant supply pipe 41 is filled with the same coolant as that in the coolant circulation unit 70. The coolant return pipe 42 connects an outlet of the cylinder flow path 250 of the hydrogen pump 200 and a connecting portion 79 (hereinafter also referred to as a "joining position") on a downstream side of the branching position 78. The coolant return pipe 42 is filled with the same coolant as that in the coolant circulation unit 70, as in the coolant supply pipe 41.

The three-way valve 44 is disposed between the branching position 78 and the water pump 45. The three-way valve 44 is configured to adjust flow rates of the coolant, flowing into the coolant supply pipe 41 from the branching position 78, supplied to the hydrogen pump 200, and the coolant bypass pipe 43, according to a control signal from the control device 20. The coolant bypass pipe 43 is configured to introduce part of the coolant, supplied from the coolant supply pipe 41 depending on an opening degree of the three-way valve 44, to the coolant return pipe 42. The water pump 45 is configured to be driven at a constant number of revolutions corresponding to electricity supplied from the control device 20, and let the coolant flow in the coolant supply pipe 41 and the coolant return pipe 42 at a flow rate corresponding to the number of revolutions.

The control device 20 is configured to control the entire fuel cell system 100. The control device 20 includes a central processing unit (CPU) 21 and a memory 25. The CPU 21 executes control programs that are previously stored in the memory 25 to function as a controller 22 and an acquisition unit 23.

The controller 22 is configured to control driving and stopping components electrically connected to the control device 20 such as the air compressor 32 and the hydrogen pump 200, so as to control operation of the fuel cell 10. In the present embodiment, the controller 22 executes hydrogen pump cooling processing, described later, to control driving the water pump 45, in order to suppress a rise in temperature of the fuel gas exhausted from the hydrogen pump 200. In the fuel cell system 100, execution of the hydrogen pump cooling processing can cool the hydrogen pump 200.

The acquisition unit 23 is configured to obtain at least one parameter corresponding to the temperature of the fuel gas exhausted from the hydrogen pump 200. In the present embodiment, the acquisition unit 23 obtains power consumption of the hydrogen pump 200 and the temperature of the coolant as the parameters. The acquisition unit 23 obtains the power consumption using voltage and current supplied to the hydrogen pump 200 from the controller 22 and obtains the temperature of the coolant from the temperature acquisition unit 77.

In the memory 25, a map 26 is previously stored. The map 26 defines a relation among the power consumption of the hydrogen pump 200, the temperature of the coolant, and ON and OFF states of the water pump 45. In the hydrogen pump cooling processing described later, driving the water pump 45 is controlled using the map 26. Details of the map 26 will be described later.

In addition to the aforementioned configuration, the fuel cell system 100 described above also includes a converter configured to boost output voltage from the fuel cell 10, a power control unit configured to control supplying electricity to a load such as a motor configured to generate power for the vehicle, or the like; however, illustrations and descriptions of these components are omitted since they are not essential to describe the present embodiment. Moreover, in the present embodiment, the aforementioned fuel gas supply manifold corresponds to a subordinate concept of the fuel gas inlet described in SUMMARY. Furthermore, the fuel off gas discharge manifold corresponds to a subordinate concept of the fuel off gas outlet described in SUMMARY.

A2. Detailed Configuration of Hydrogen Pump

Figure 2:
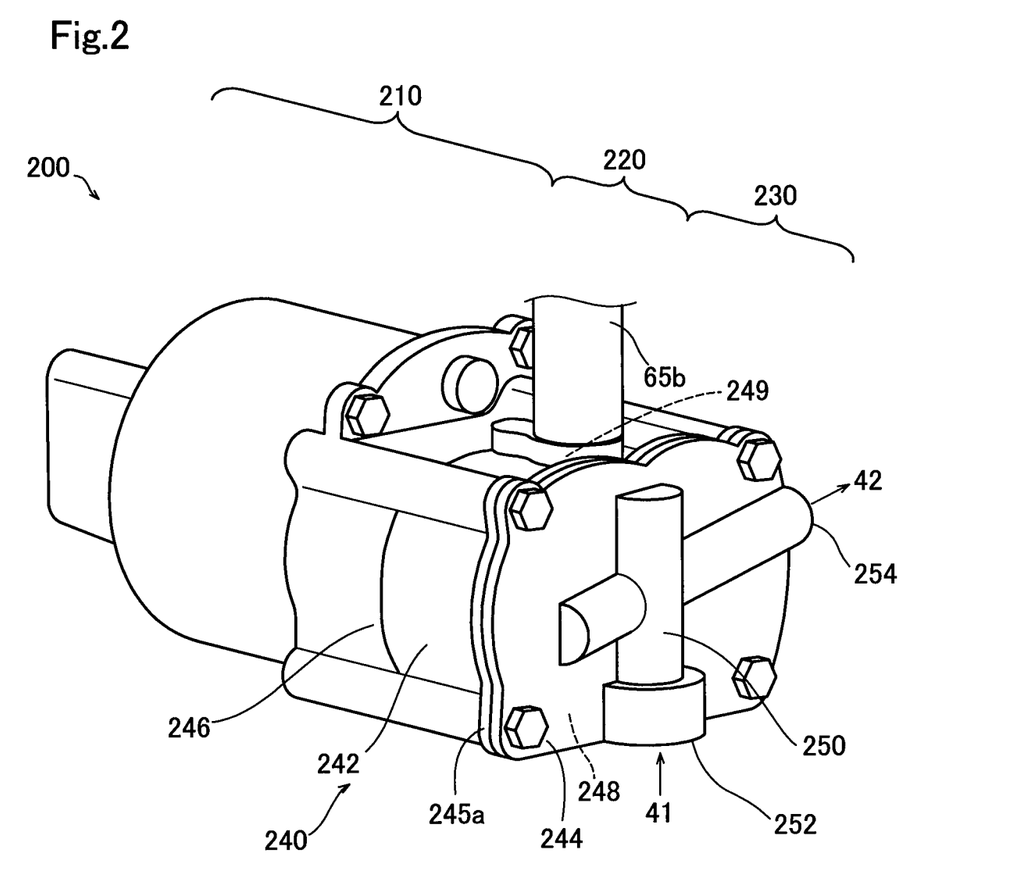
FIG. 2 shows a configuration of a hydrogen pump according to an embodiment.

FIG. 2 shows a configuration of a hydrogen pump 200 according to one embodiment. The hydrogen pump 200 is a roots type pump (roots pump) and includes a motor unit 210, a pump unit 230 including a pair of rotors, and a gear unit 220 connecting the pair of rotors of the pump unit 230 and the motor unit 210.

Figure 3:
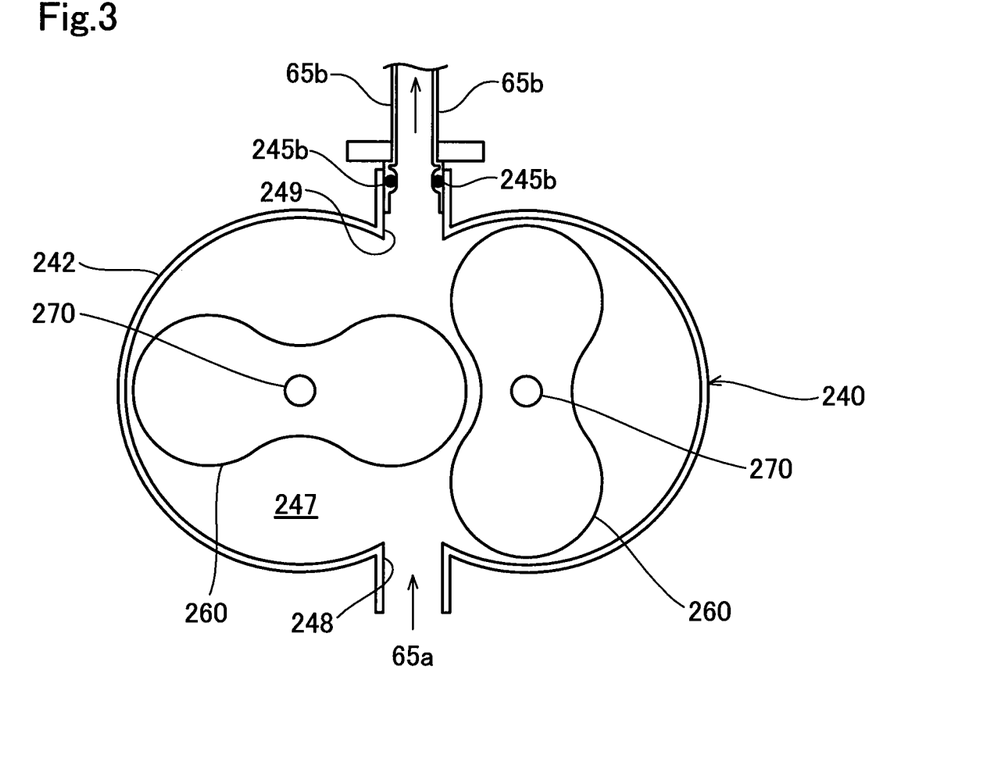
FIG. 3 is a schematic cross sectional view of the hydrogen pump taken along a direction orthogonal to rotary shafts of rotors included in a pump unit of the hydrogen pump.
Figure 4:
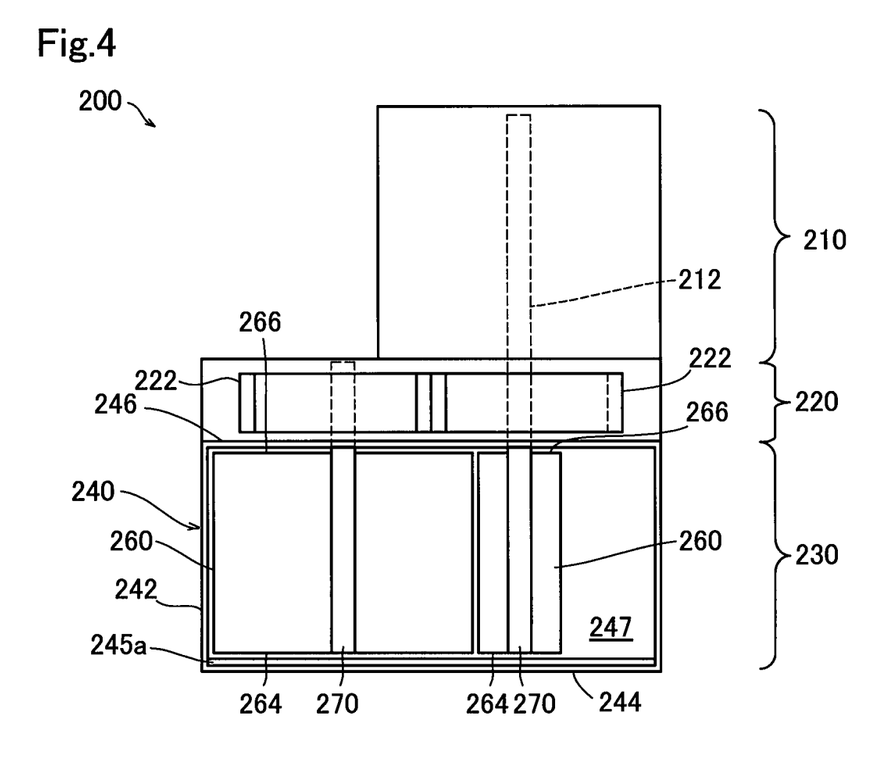
FIG. 4 is a schematic cross sectional view of the hydrogen pump taken along a direction of the rotary shafts of the rotors included in the pump unit of the hydrogen pump.

FIG. 3 is a schematic cross sectional view of the hydrogen pump 200 taken along a direction orthogonal to rotary shafts of the pair of rotors included in the pump unit 230 of the hydrogen pump 200. FIG. 4 is a schematic cross sectional view of the hydrogen pump 200 taken along a direction of the rotary shafts of the pair of rotors included in the pump unit 230 of the hydrogen pump 200. As shown in FIGS. 2, 3, and 4, the pump unit 230 includes a cylinder 240 and the pair of rotors 260. The cylinder 240 includes a pair of side walls 244 and 246 and a peripheral wall 242 connecting peripheries of the pair of side walls 244 and 246. A gasket 245a is disposed between one of the pair of side walls 244 and the peripheral wall 242. The gasket 245a is an elastic member having an outer shape similar to that of the side wall 244. The gasket 245a is in a pressure contact with an inner surface of the side wall 244 so as to seal a gap between the side wall 244 and the peripheral wall 242. In the present embodiment, the gasket 245a is formed of ethylene propylene diene monomer rubber (EPDM).

As shown in FIG. 3, the cylinder 240 includes a pump chamber 247. The pump chamber 247 is a sealed space in the cylinder 240 surrounded by the pair of side walls 244 and 246 and the peripheral wall 242. The cylinder 240 includes an inlet 248 and an outlet 249 at opposing positions to each other in the peripheral wall 242. The inlet 248 is connected to a part 65a (FIG. 1) of the circulation pipe 65 connecting the gas-liquid separator 62 and the hydrogen pump 200 while the outlet 249 is connected to a part 65b (FIG. 1) of the circulation pipe 65 joining to the fuel gas supply pipe 51.

A gasket 245b is disposed at a connecting portion between the outlet 249 and the part 65b of the circulation pipe 65. The gasket 245b is a ring-shaped elastic member that has an approximate circular cross section. The gasket 245b is used to enhance air tightness between the outlet 249 and the circulation pipe 65. When the circulation pipe 65 is attached (press-fitted) into the hydrogen pump 200, the gasket 245b is brought into press-contact with an outer surface of the outlet 249 to seal a gap between the outer surface of the outlet 249 and an outer surface of the circulation pipe 65, more specifically, an outer surface of the part 65b of the circulation pipe 65 joining to the fuel gas supply pipe 51. In the present embodiment, the gasket 245b is formed of ethylene-propylene-diene copolymer rubber (EPDM), as with the gasket 245a. Therefore, the gasket 245a and the gasket 245b have a heat resisting property of about 130° C.

As shown in FIGS. 3 and 4, the pair of rotors 260 are housed in the pump chamber 247 of the cylinder 240. The pair of rotors 260 each have a cotyledon cross-sectional shape (gourd shape) and include a rotary shaft 270 in the center. The rotary shafts 270 are rotatably supported by the side wall 244 of the cylinder 240. The pair of rotors 260 are housed in the pump chamber 247 such that they engage with each other. End surfaces 264 and 266, which are orthogonal to the rotary shafts 270 of the pair of rotors 260, are disposed to face the pair of side walls 244 and 246 of the cylinder 240.

As shown in FIG. 2, the cylinder flow path 250 is disposed in one of the pair of side walls 244 of the cylinder 240. The coolant flows through the cylinder flow path 250. One end 252 of the cylinder flow path 250 is connected with the coolant supply pipe 41 while the other end 254 is connected with the coolant return pipe 42. A flow of the coolant through the cylinder flow path 250 cools the cylinder 240. Note that processing to let the coolant flow through the cylinder flow path 250 will be described later.

As shown in FIGS. 2 and 4, a gear unit 220 is attached to an outside of the other one of the pair of side walls 246 of the cylinder 240. As shown in FIG. 4, the gear unit 220 includes a pair of gears 222. The pair of gears 222 are fixed to the rotary shafts 270, extending from the pair of rotors 260 in the pump unit 230, such that the pair of gears 222 engage with each other.

As shown in FIG. 2, the motor unit 210 is attached to an opposite side of the gear unit 220 from the pump unit 230. As shown in FIG. 4, the motor unit 210 includes a drive shaft 212. The drive shaft 212 is connected to the rotary shaft 270 of one of the pair of rotors 260 in the pump unit 230. The motor unit 210 is configured to receive electricity from the control device 20 so as to rotate the drive shaft 212.

In the hydrogen pump 200 with the aforementioned configuration, driving motor unit 210 rotates the drive shaft 212, which rotates the rotary shaft 270 connected to the drive shaft 212. At this time, one of the pair of gears 222 and one of the pair of rotors 260 disposed on this rotary shaft 270 are rotated. In addition, rotation of one of the pair of gears 222 rotates the other one of the pair of gears 222 in an opposite direction to a rotating direction of the one of the pair of gears 222. Accordingly, the other one of the rotary shafts 270, to which the other one of the pair of gears 222 is fixed, is rotated in the opposite direction to the rotating direction of the one of the rotary shafts 270, which rotates the other one of the pair of rotors 260 in the opposite direction to the rotating direction of the one of the pair of rotors 260. As a result, due to the rotation of the pair of rotors 260 in the pump chamber 247, the hydrogen gas serving as the fuel gas is taken in from the inlet 248 to the pump chamber 247 and then discharged to the outside of the pump chamber 247 from the outlet 249. Consequently, the hydrogen gas, included in the fuel off gas exhausted from the fuel cell 10, is transported through the circulation pipe 65 and supplied to the fuel cell 10 as the fuel gas again.

A3. Hydrogen Pump Cooling Processing

Figure 5:
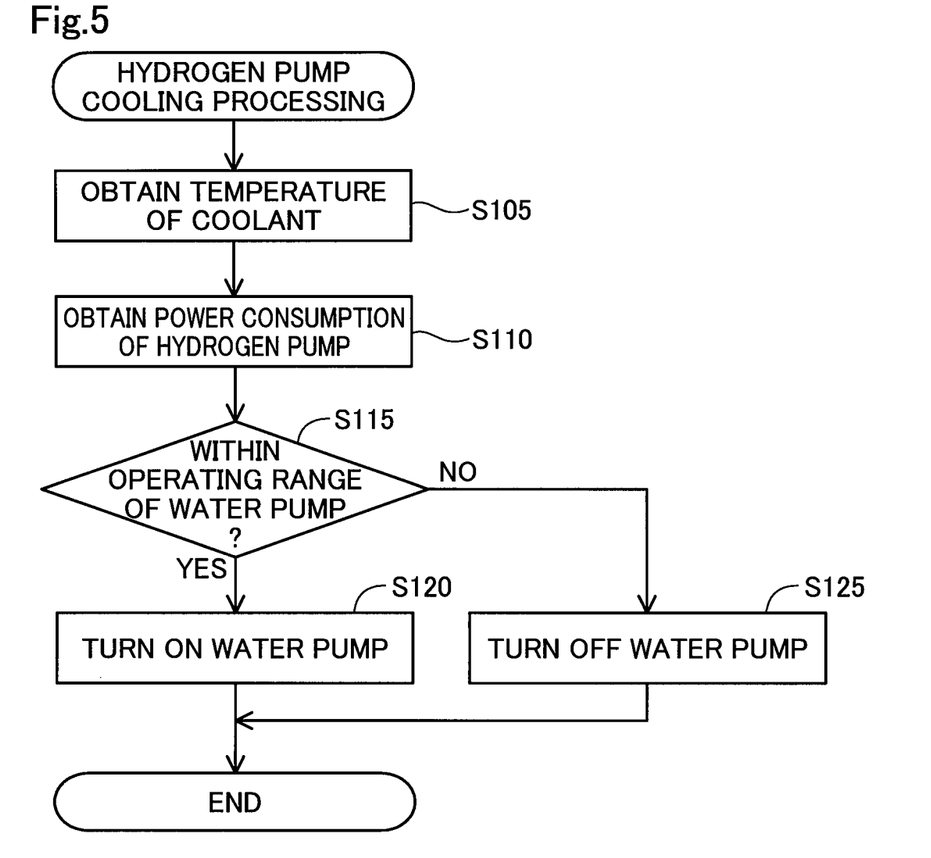
FIG. 5 is a flowchart showing procedures of hydrogen pump cooling processing.

FIG. 5 is a flowchart showing procedures of the hydrogen pump cooling processing. The hydrogen pump cooling processing is performed to prevent temperature on a side of the outlet 249 of the hydrogen pump 200 from reaching or exceeding predetermined temperature by driving the water pump 45. In the fuel cell system 100, a high-order ECU (Electronic Control Unit), configured to control a vehicle as a whole, transmits a signal indicating that an ignition switch is turned on from off. When the control device 20 receives the signal, the hydrogen pump cooling processing shown in FIG. 5 is executed. The hydrogen pump cooling processing is repeatedly executed at predetermined intervals until the ignition switch is turned off from on. The predetermined intervals may be 60 seconds, for example.

The acquisition unit 23 obtains the temperature of the coolant from the temperature acquisition unit 77 (step S105). Next, the acquisition unit 23 obtains the power consumption of the hydrogen pump 200 (step S110). Note that the steps S105 and S110 may be executed in an appropriate order or simultaneously. Next, the controller 22 determines whether the temperature of the coolant and the power consumption of the hydrogen pump 200 thus obtained are within an operating range of the water pump 45, using the map 26 previously stored in the memory 25 (step S115). In the present embodiment, the "operating range of the water pump 45" means an area consisting of an aggregate of operating points where the water pump 45 is turned on as defined in the map 26. It will be described hereinafter along with a configuration of the map 26.

Figure 6:
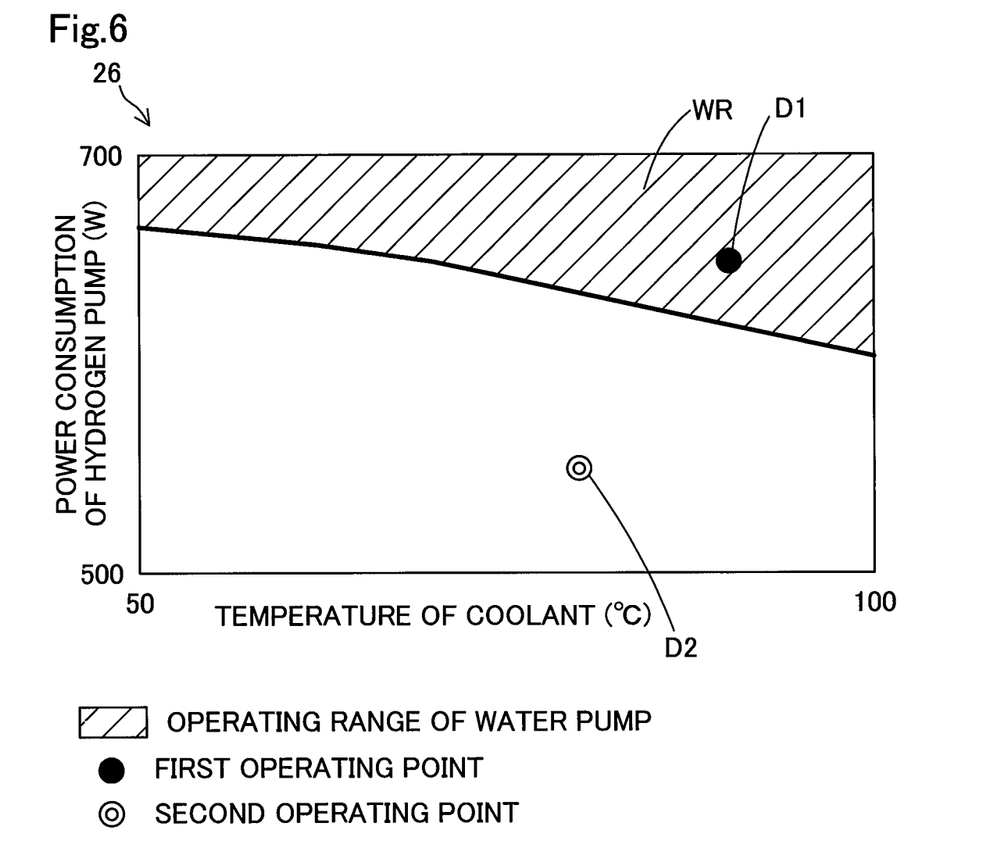
FIG. 6 shows a map showing an operating range of a water pump according to an embodiment.

FIG. 6 shows the map 26 showing the operating range WR of the water pump 45 according to an embodiment. In FIG. 6, a horizontal axis represents the temperature of the coolant while a vertical axis represents the power consumption of the hydrogen pump 200. As shown in FIG. 6, the operating range WR of the water pump 45 is defined based on the relation between the temperature of the coolant and the power consumption of the hydrogen pump 200. That is, the map 26 defines the operating points corresponding to the temperature of the coolant and the power consumption of the hydrogen pump 200. As shown in FIG. 6, the map 26 defines a first operating point D1 included in the operating range WR and a second operating point D2 not included in the operating range WR. Note that the operating points D1 and D2 are only examples and the map 26 defines a number of operating points corresponding to the temperature of the coolant and the power consumption of the hydrogen pump 200.

As shown in FIG. 6, the operating range WR is defined such that when the temperature of the coolant is getting lower, compared with a higher temperature case, an area of small power consumption of the hydrogen pump 200 is getting smaller. Moreover, the operating range WR is defined such that when the temperature of the coolant is getting higher, compared with a lower temperature case, the area of the small power consumption of the hydrogen pump 200 is getting larger. Compared with the first operating point D1 included in the operating range WR, the second operating point D2 not included in the operating range WR is lower than the first operating point D1 in both the power consumption of the hydrogen pump 200 and the temperature of the coolant.

The map 26 has only to control the temperature of the outlet 249 of the hydrogen pump 200 within a predetermined range and can be appropriately defined by experiment or the like. In any case, when the first operating point D1 on the map 26 where the water pump 45 is operated and the second operating point D2 on the map 26 where the water pump 45 is stopped are compared, there is a relation in which the second operating point D2 is lower than the first operating point D1 in at least one of the power consumption of the hydrogen pump 200 and the temperature of the coolant. The map 26 is calculated by experiment based on a relation between the power consumption of the hydrogen pump 200 and the temperature of the fuel gas exhausted from the hydrogen pump 200, as described below. The fuel gas exhausted from the hydrogen pump 200 is referred to as "exhaust gas" in the description below.

Figure 7:
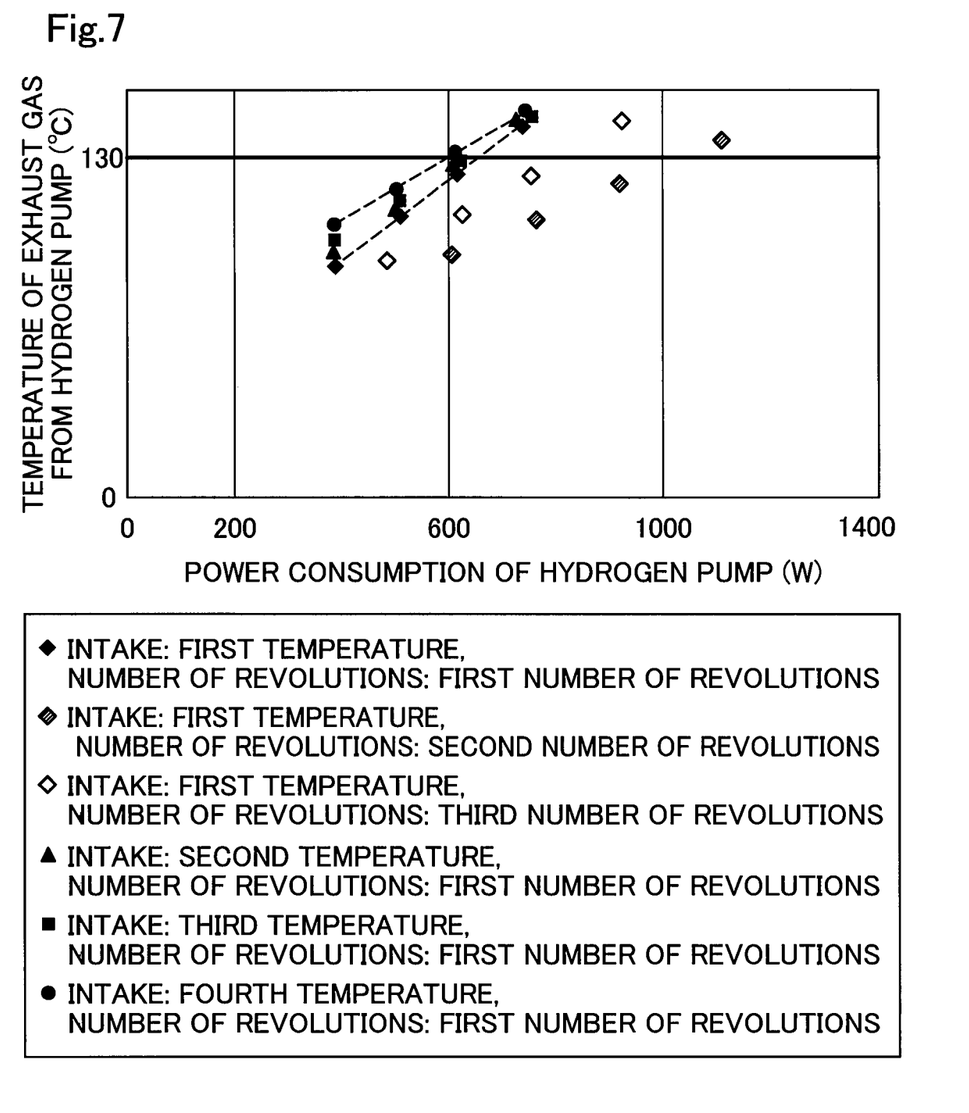
FIG. 7 shows a relation between power consumption of the hydrogen pump and temperature of exhaust gas from the hydrogen pump.

FIG. 7 shows the relation between the power consumption of the hydrogen pump 200 and the temperature of the exhaust gas from the hydrogen pump 200. In FIG. 7, a horizontal axis represents the power consumption of the hydrogen pump 200 while a vertical axis represents the temperature of the exhaust gas from the hydrogen pump 200. FIG. 7 shows temperatures of exhaust gas in the cases where a number of revolutions of the hydrogen pump 200 is at a first, second, and third number of revolutions when the fuel gas taken in from the inlet 248 of the hydrogen pump 200 (hereinafter referred to as "intake gas") is at a first temperature. It also shows the temperatures of the exhaust gas in the cases where the number of revolutions of the hydrogen pump 200 is at the first number of revolutions when the temperature of the intake gas is at a second, third, and fourth temperatures. Note that the temperature of the coolant is used as the temperature of the intake gas since the temperature of the intake gas varies correspondingly to the temperature of the coolant and is lower than the temperature of the coolant. The first, second, third, and fourth temperatures are getting lower in this order, and the first, second, and third number of revolutions are also getting lower in this order.

Here, the inventor of the present disclosure have found three facts, described below, from results of various experiments.

(1) When the hydrogen pump 200 is disposed apart from the fuel cell 10, the fuel gas is adiabatically compressed to keep its pressure at the outlet 249 of the hydrogen pump 200, which raises the temperature of the fuel gas at the outlet 249.

(2) The temperature of the exhaust gas from the hydrogen pump 200 is likely to rise when the power consumption of the hydrogen pump 200 is low and the number of revolutions of the hydrogen pump 200 is small.

(3) When pressure of the intake gas is fixed at 225 kilopascals, the temperature of the exhaust gas exceeds about 130° C., which is heat resisting temperature of the gasket 245b, at about 58 kilopascals of differential pressure between the pressures of the intake gas and the exhaust gas.

In the relation between the power consumption and the temperature of the exhaust gas shown in FIG. 7, the number of revolutions of the hydrogen pump 200 that generates the differential pressure of 58 kilopascals is the first number of revolutions in all cases. At this time, the map 26 shown in FIG. 6 can be obtained by calculating the power consumption corresponding to the first number of revolutions. Note that, as shown by broken lines in FIG. 7, the power consumption of the hydrogen pump 200 and the temperature of the exhaust gas linearly increase with respect to the differential pressure between the pressures of the intake gas and the exhaust gas.

Returning to FIG. 5, in the step S115 described above, the controller 22 checks the obtained temperature of the coolant and the power consumption of the hydrogen pump 200 against the map 26 so as to retrieve an operating point corresponding to the temperature of the coolant and the power consumption of the hydrogen pump 200 and determine whether the operating point is within the operating range WR of the water pump 45. When it is determined that the operating point is within the operating range WR (step S115: YES), the controller 22 turns on the water pump 45 (step S120). As a result, the coolant is sent from the water pump 45 to the hydrogen pump 200. A flow of the coolant through the cylinder flow path 250 cools the hydrogen pump 200. On the other hand, when it is determined that the operating point is not within the operating range WR in the step S115 (step S115: NO), the controller 22 turns off the water pump 45 (step S125).

After executing the steps S120 or S125, the controller 22 terminates the hydrogen pump cooling processing. After a predetermined interval, the controller 22 starts the hydrogen pump cooling processing again and executes the step S105 described above.

The fuel cell system 100 in the first embodiment with the configuration described above comprises the hydrogen pump 200, the water pump 45 configured to deliver the coolant to the hydrogen pump 200, the acquisition unit 23 configured to obtain the power consumption of the hydrogen pump 200 and the temperature of the coolant as the parameters corresponding to the temperature of the fuel gas exhausted from the hydrogen pump 200, and the controller 22 configured to switch between ON and OFF states of the water pump 45 according to the obtained parameters. Therefore, the ON and OFF states of the water pump 45 can be switched depending on the temperature of the fuel gas exhausted from the hydrogen pump 200. Accordingly, the hydrogen pump 200 can be suitably cooled according to the temperature of the fuel gas exhausted from the hydrogen pump 200, and thus a rise in temperature of the fuel gas exhausted from the hydrogen pump 200 can be suppressed.

Moreover, as the parameters corresponding to the temperature of the fuel gas exhausted from the hydrogen pump 200, the power consumption of the hydrogen pump 200 and the temperature of the coolant are obtained. Therefore, the ON and OFF states of the water pump 45 can be switched even without a sensor configured to detect the temperature of the fuel gas exhausted from the hydrogen pump 200.

In addition, the map 26, which defines the relation among the power consumption of the hydrogen pump 200, the temperature of the coolant, and ON and OFF states of the water pump 45, is used to control the ON and OFF states of the water pump 45. Therefore, the ON and OFF states of the water pump 45 can be switched easily. Furthermore, as for the relation between the ON and OFF states of the water pump 45 in the map 26, when the first operating point D1 where the water pump 45 is turned on and the second operating point D2 where the water pump 45 is turned off are compared, the second operating point D2 is lower than the first operating point D1 in at least one of the temperature of the coolant and the power consumption. Therefore, the water pump 45 can be turned on at least when the temperature of the coolant is higher than that of the second operating point D2 or when the power consumption is larger than that of the second operating point D2. Furthermore, the water pump 45 can be turned on when the temperature of the coolant is high and the power consumption is small, or when the temperature of the coolant is low and the power consumption is large, that is, when the temperature of the fuel gas exhausted from the hydrogen pump 200 is still relatively low.

B. Second Embodiment

Figure 8:
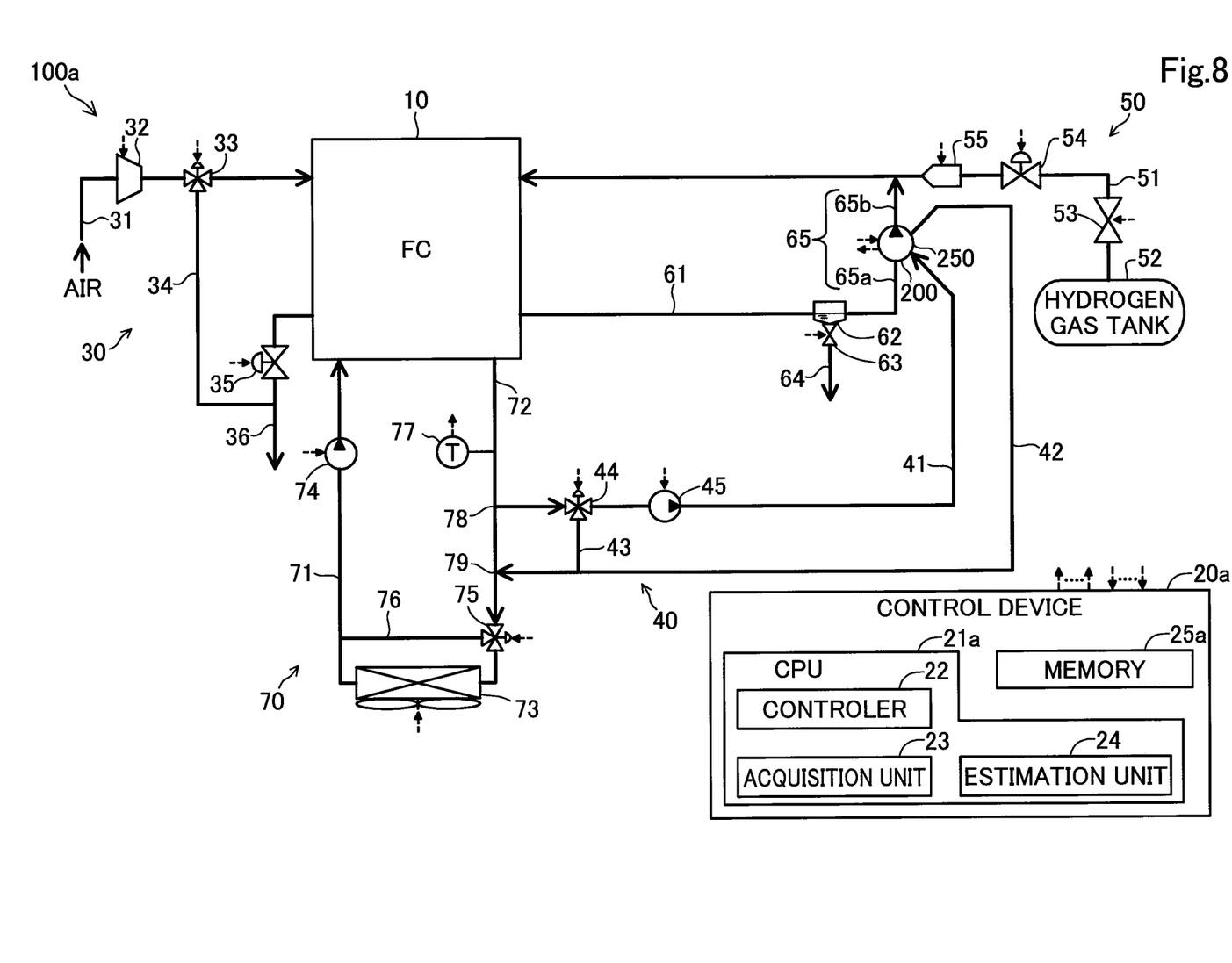
FIG. 8 shows a configuration of a fuel cell system according to a second embodiment.

FIG. 8 shows a configuration of a fuel cell system 100a according to a second embodiment. In FIG. 8 and the description below, elements that are the same as those in the first embodiment are denoted with the same referential numerals as in the first embodiment, and the description thereof will be omitted. The fuel cell system 100a in the second embodiment is different from the fuel cell system 100 in the first embodiment in that it includes a control device 20a in place of the control device 20. The control device 20a is different from the control device 20 in that it includes a CPU 21a in place of the CPU 21 and a memory 25a in place of the memory 25. The CPU 21a is different form the CPU 21 in that it functions as an estimation unit 24. The memory 25a is different from the memory 25 in that it omits the map 26.

The estimation unit 24 uses the temperature of the coolant and the power consumption of the hydrogen pump 200 to estimate the temperature T2 of the exhaust gas form the hydrogen pump 200 by Formula (1) below:

[Math 1]

[Math. 1]

$$T2 = T1 \times \left(\frac{P2}{P1}\right)^{\frac{r-1}{r}} \quad (1)$$

In the Formula (1), T1 represents the temperature of the coolant, P1 represents the pressure of the fuel gas at the inlet 248 of the hydrogen pump 200, P2 represents the pressure of the fuel gas at the outlet 249 of the hydrogen pump 200, and r represents a specific heat ratio of the fuel gas.

Here, as shown in FIG. 8, the hydrogen pump 200 in the fuel cell system 100a does not include a pressure sensor. Accordingly, in the present embodiment, as the pressure (P1) of the fuel gas at the inlet 248 of the hydrogen pump 200 and the pressure (P2) of the fuel gas at the outlet 249 of the hydrogen pump 200, the power consumption of the hydrogen pump 200 is used. This is because the pressure of the hydrogen pump 200 is determined according to the number of revolutions of the hydrogen pump 200, and the power consumption of the hydrogen pump 200 is determined according to the number of revolutions and the pressure of the hydrogen pump 200. Accordingly, the power consumption of the hydrogen pump 200 obtained in the step S110 described above is used for variables P1 and P2 in the Formula (1). The temperature of the exhaust gas estimated by the estimation unit 24 is used to control the ON and OFF states of the water pump 45.

Figure 9:
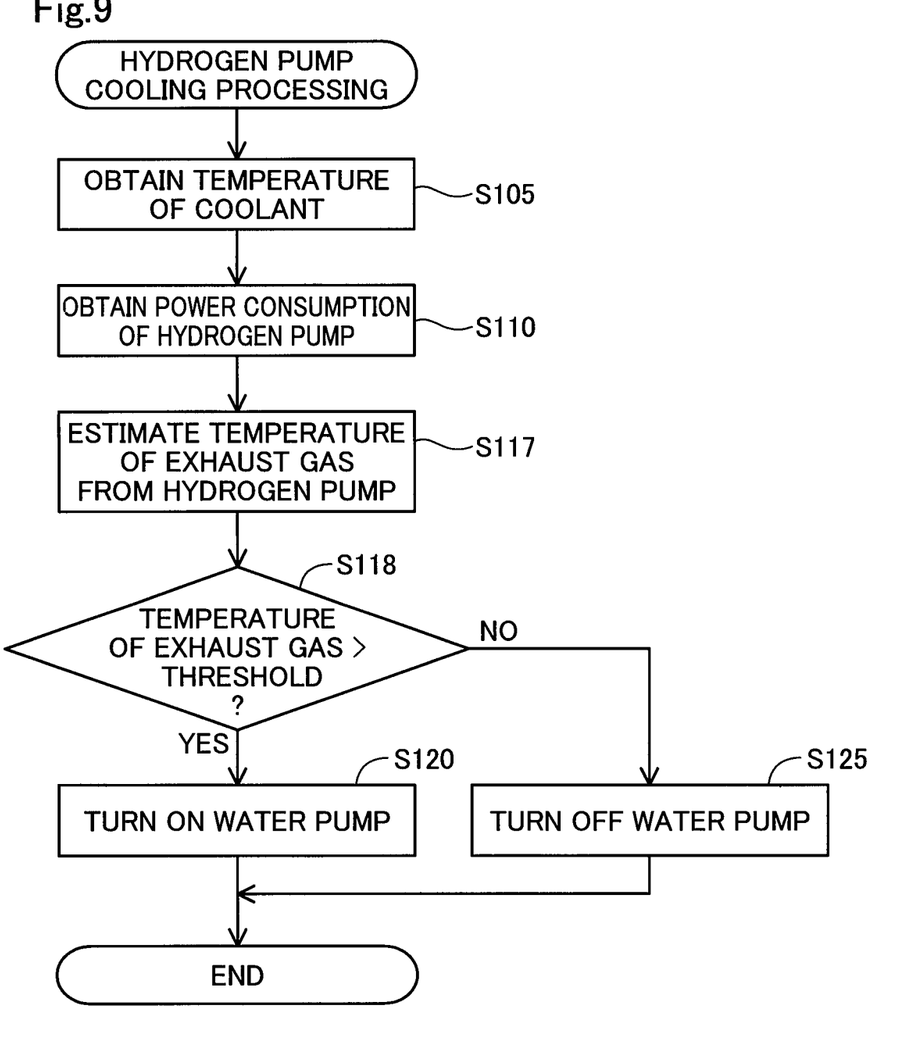
FIG. 9 is a flowchart showing procedures of hydrogen pump cooling processing according to the second embodiment.

FIG. 9 is a flowchart showing procedures of the hydrogen pump cooling processing according to the second embodiment. The hydrogen pump cooling processing in the second embodiment is different from the hydrogen pump cooling processing in the first embodiment in that the step S115 is omitted and steps S117 and S118 are additionally executed.

As shown in FIG. 9, after the power consumption of the hydrogen pump 200 is obtained (step S110), the estimation unit 24 estimates the temperature of the exhaust gas from the hydrogen pump 200 (step S117). As described above, the estimation unit 24 uses the temperature of the coolant obtained in the step S105, the power consumption of the hydrogen pump 200 obtained in the step S110, and the Formula (1) so as to estimate the temperature of the exhaust gas from the hydrogen pump 200.

Next, the controller 22 determines whether the estimated temperature of the exhaust gas is higher than a predetermined threshold (step S118). In the present embodiment, the "predetermined threshold" is set to 130° C. Note that the threshold may be set to any temperature in a range of 125° C. to 135° C., instead of 130° C. When the estimated temperature of the exhaust gas is higher than the threshold, the controller 22 turns on the water pump 45 (step S120). On the other hand, when the estimated temperature of the exhaust gas is equal to or lower than the threshold, the controller 22 turns off the water pump 45 (step S125).

The fuel cell system 100a in the second embodiment with the aforementioned configuration can provide the same advantageous effects as those of the first embodiment. In addition, the fuel cell system further comprises the estimation unit 24 configured to estimate the temperature of the fuel gas at the outlet 249 of the hydrogen pump 200 for the fuel gas, and the controller 22 turns on the water pump 45 when the estimated temperature of the fuel gas is higher than the predetermined threshold, and turns off the water pump 45 when the estimated temperature of the fuel gas is equal to or lower than the predetermined threshold. Therefore, the ON and OFF states of the water pump 45 can be switched even without a sensor configured to detect the temperature of the fuel gas at the outlet 249 of the hydrogen pump 200 for the fuel gas. Moreover, omission of the sensor can simplify the fuel cell system 100a.

C. Alternative Embodiments

C1. Alternative Embodiment 1

In the forgoing embodiments, the temperature of the exhaust gas from the hydrogen pump 200 may be obtained to control the ON and OFF states of the water pump 45. Specifically, the fuel cell system 100 may include a sensor configured to detect the temperature of the exhaust gas in a vicinity of the outlet 249 of the hydrogen pump 200, and the controller 22 may determine whether the temperature of the exhaust gas detected by the sensor is higher than the predetermined threshold so as to control the ON and OFF states of the water pump 45. Such a configuration can provide the same advantageous effects as those of the foregoing embodiments.

C2. Alternative Embodiment 2

In the foregoing first embodiment, the controller 22 controls the ON and OFF states of the water pump 45 using the map 26; however, the present disclosure is not limited to this. For example, the controller 22 may control the ON and OFF states of the water pump 45 based on the relation between the power consumption of the hydrogen pump 200 and the temperature of the exhaust gas from the hydrogen pump 200 shown in FIG. 7 in place of the map 26. Specifically, the controller 22 may obtain the number of revolutions and the power consumption of the hydrogen pump 200, check them against the relation shown in FIG. 7 so as to calculate the temperature of the exhaust gas from the hydrogen pump 200, and determine whether the calculated temperature of the exhaust gas exceeds the threshold of 130° C. so as to control the ON and OFF states of the water pump 45. Such a configuration can provide the same advantageous effects as those of the first embodiment.

C3. Alternative Embodiment 3

In the forgoing first embodiment, as the parameters corresponding to the temperature of the exhaust gas from the hydrogen pump 200, the temperature of the coolant and the power consumption of the hydrogen pump 200 are obtained. In addition, in the forgoing alternative embodiment 1, as the parameter corresponding to the temperature of the exhaust gas from the hydrogen pump 200, the temperature of the exhaust gas from the hydrogen pump 200 is obtained. However, as the parameters corresponding to the temperature of the exhaust gas from the hydrogen pump 200, the number of revolutions of the hydrogen pump 200 and the temperature of the coolant may be obtained. That is, any configuration can generally provide the same advantageous effects as those of the first embodiment and the alternative embodiment 1 described above as long as the parameter corresponding to the temperature of the fuel gas exhausted from the hydrogen pump 200 is obtained and the switching of the ON and OFF states of the water pump 45 is controlled based on the parameter.

C4. Alternative Embodiment 4

In the forgoing embodiments, as a member enhancing the airtightness at the connecting portion between the outlet 249 of the hydrogen pump 200 and the part 65b of the circulation pipe 65, a metal seal may be used in place of the gasket 245b. Even in such a configuration, the temperature on the side of the outlet 249 of the hydrogen pump 200 can be controlled not to reach or exceed the predetermined temperature by controlling the ON and OFF states of the water pump 45 using the parameter corresponding to the temperature of the exhaust gas from the hydrogen pump 200.

The present disclosure is not limited to the foregoing embodiments, and can be implemented in various configurations without departing from the spirit and scope of the present disclosure. For example, the technical features in the embodiments may be replaced or combined as appropriate, in order to solve part or all of the problems described above or in order to achieve part or all of the advantageous effects described above. Some technical features that are not described as being essential herein may be omitted as appropriate. For example, the present disclosure can be implemented as the following aspects.

(1) According to one aspect of the present disclosure, a fuel cell system is provided. The fuel cell system comprises a fuel cell, a fuel gas supply pipe connected to a fuel gas inlet of the fuel cell, a circulation pipe connecting a fuel off gas outlet of the fuel cell and the fuel gas supply pipe, a hydrogen pump disposed on the circulation pipe, a water pump configured to deliver coolant, discharged from the fuel cell, to the hydrogen pump, an acquisition unit configured to obtain at least one parameter corresponding to temperature of fuel gas exhausted from the hydrogen pump, and a controller configured to switch between ON and OFF states of the water pump according to the parameter obtained by the acquisition unit.

The fuel cell system according to this aspect comprises the hydrogen pump, the water pump configured to deliver the coolant to the hydrogen pump, the acquisition unit configured to obtain the parameter corresponding to the temperature of the fuel gas exhausted from the hydrogen pump, and the controller configured to switch between ON and OFF states of the water pump according to the obtained parameter. Therefore, the ON and OFF states of the water pump can be switched according to the temperature of the fuel gas exhausted from the hydrogen pump. Accordingly, the hydrogen pump can be suitably cooled depending on the temperature of the fuel gas exhausted from the hydrogen pump, thereby suppressing a rise in the temperature of the fuel gas exhausted from the hydrogen pump.

(2) In the fuel cell system in the aforementioned aspect, the acquisition unit may obtain power consumption of the hydrogen pump and temperature of the coolant as the parameters.

According to the fuel cell system in this aspect, the power consumption of the hydrogen pump and the temperature of the coolant are obtained as the parameters. Therefore, the ON and OFF states of the water pump can be switched even without a sensor configured to detect the temperature of the fuel gas exhausted from the hydrogen pump.

(3) In the aforementioned aspect, the fuel cell system may further comprise a map defining a relation among the power consumption, the temperature of the coolant, and the ON and OFF states of the water pump, and the controller may control switching between the ON and OFF states of the water pump using the map.

According to the fuel cell system in this aspect, switching between the ON and OFF states of the water pump is controlled using the map defining the relation among the power consumption, the temperature of the coolant, and the ON and OFF states of the water pump. Therefore, the ON and OFF states of the water pump can be switched easily.

(4) In the fuel cell system in the aforementioned aspect, when a first operating point, where the water pump is turned on, and a second operating point, where the water pump is turned off, are compared, a relation between the ON and OFF states of the water pump defined in the map may be that the second operating point is lower than the first operating point in at least one of the temperature of the coolant and the power consumption.

According to the fuel cell system in this aspect, when the first operating point, where the water pump is turned on, and the second operating point, where the water pump is turned off, are compared, the relation between the ON and OFF states of the water pump defined in the map is that the second operating point is lower than the first operating point in at least one of the temperature of the coolant and the power consumption. Accordingly, the water pump can be turned on at least when the temperature of the coolant is higher than that of the second operating point or the power consumption is larger than that of the second operating point. In addition, the water pump can be turned on when the temperature of the coolant is high and the power consumption is small, or when the temperature of the coolant is low and the power consumption is large, that is, when the temperature of the fuel gas exhausted from the hydrogen pump is still relatively low.

(5) In the aforementioned aspect, the fuel cell system may further comprise an estimation unit configured to estimate the temperature of the fuel gas at an outlet of the hydrogen pump for the fuel gas. The controller may turn on the water pump when the temperature of the fuel gas estimated by the estimation unit is higher than a predetermined threshold, and turn off the water pump when the temperature of the fuel gas estimated by the estimation unit is equal to or lower than the predetermined threshold.

According to the fuel cell system in this aspect, the estimation unit configured to estimate the temperature of the fuel gas at the outlet of the hydrogen pump for the fuel gas is further disposed, and the controller turns on the water pump when the estimated temperature of the fuel gas is higher than a predetermined threshold, and turns off the water pump when the estimated temperature of the fuel gas is equal to or lower than the predetermined threshold. Therefore, the ON and OFF states of the water pump can be switched even without a sensor configured to detect the temperature of the fuel gas at the outlet of the hydrogen pump for the fuel gas. In addition, omission of the sensor can simplify the fuel cell system.

(6) According to alternative aspect of the present disclosure, a method of controlling the fuel cell system is provided. This method controls the fuel cell system comprising the fuel cell, the fuel gas supply pipe connected to the fuel gas inlet of the fuel cell, the circulation pipe connecting the fuel off gas outlet of the fuel cell and the fuel gas supply pipe, the hydrogen pump disposed on the circulation pipe, and the water pump configured to deliver the coolant discharged from the fuel cell to the hydrogen pump. The method comprises obtaining the parameter corresponding to the temperature of the fuel gas exhausted from the hydrogen pump, and switching between the ON and OFF states of the water pump according to the obtained parameter.

According to the method of controlling the fuel cell system in this aspect, the parameter corresponding to the temperature of the fuel gas exhausted from the hydrogen pump is obtained, and the ON and OFF states of the water pump is switched according to the obtained parameter. Therefore, the ON and OFF states of the water pump can be switched according to the temperature of the fuel gas exhausted from the hydrogen pump. As a result, the hydrogen pump can be suitably cooled depending on the temperature of the fuel gas exhausted from the hydrogen pump, thereby suppressing a rise in the temperature of the fuel gas exhausted from the hydrogen pump.

The present disclosure can be implemented in various aspects. For example, it may be implemented in such aspects as a vehicle equipped with the fuel cell system, a method of controlling the fuel cell system, and a method of cooling the hydrogen pump.

What is claimed is:

1. A fuel cell system comprising:
   a fuel cell;
   a fuel gas supply pipe connected to a fuel gas inlet of the fuel cell;
   a circulation pipe connecting a fuel off gas outlet of the fuel cell and the fuel gas supply pipe;
   a hydrogen pump disposed on the circulation pipe;
   a water pump configured to deliver coolant, discharged from the fuel cell, to the hydrogen pump;
   an acquisition unit configured to obtain at least one parameter, wherein the parameter is related to a temperature of the fuel gas exhausted from the hydrogen pump, the parameter including a power consumption of the hydrogen pump, a temperature of the coolant, and a number of revolutions of the hydrogen pump; and
   a controller programmed to determine whether to cool the hydrogen pump using a combination of the acquired parameter obtained by the acquisition unit, and to control ON and OFF states of the water pump using a result of the determination.

2. The fuel cell system according to claim 1 further comprising a map defining a relation among the power consumption, the temperature of the coolant, and the ON and OFF states of the water pump,
   wherein the controller controls switching between the ON and OFF states of the water pump using the map.

3. The fuel cell system according to claim 2,
   wherein when a first operating point where the water pump is turned on and a second operating point where the water pump is turned off are compared, a relation between the ON and OFF states of the water pump defined in the map is that the second operating point is lower than the first operating point in at least one of the temperature of the coolant and the power consumption.

4. The fuel cell system according to claim 1 further comprising an estimation unit configured to estimate the temperature of the fuel gas at an outlet of the hydrogen pump for the fuel gas,
   wherein the controller turns on the water pump when the temperature of the fuel gas estimated by the estimation unit is higher than a predetermined threshold, and turns off the water pump when the temperature of the fuel gas estimated by the estimation unit is equal to or lower than the predetermined threshold.

5. A method of controlling a fuel cell system, the fuel cell system comprising a fuel cell, fuel gas supply pipe connected to a fuel gas inlet of the fuel cell, circulation pipe connecting a fuel off gas outlet of the fuel cell and the fuel gas supply pipe, a hydrogen pump disposed on the circulation pipe, and a water pump configured to deliver coolant discharged from the fuel cell to the hydrogen pump, the method comprising:
   obtaining at least one parameter, wherein the parameter is related to a temperature of the fuel gas exhausted from the hydrogen pump, the parameter including a power consumption of the hydrogen pump, a temperature of the coolant, and a number of revolutions of the hydrogen pump; and
   switching between ON and OFF states of the water pump according to the obtained parameter, based on a determination of whether to cool the hydrogen pump using a combination of the obtained parameter.

* * * * *